United States Patent Office 2,743,250
Patented Apr. 24, 1956

2,743,250

POLYMERIC LINEAR TEREPHTHALATE COMPOSITIONS AND ARTICLES MADE THEREFROM

Sterling S. Sweet, Maurice H. Van Horn, and Philip T. Newsome, Rochester, N. Y., assignors to Eastman Kodak Company, Rochester, N. Y., a corporation of New Jersey No Drawing. Application June 25, 1953,
Serial No. 364,183

11 Claims. (Cl. 260—31.2)

This invention relates to new compositions of matter containing highly polymeric polymethylene terephthalates dissolved in a solvent mixture containing substantial proportions of trifluoroacetic acid and another compatible solvent; and to the manufacture of synthetic filaments, yarns, sheets, films and other shaped articles therefrom by dry spinning, or other suitable evaporative processes, wherein the solvent is expelled from the shaped articles by controlled heated atmospheres, or by contact with a heated surface.

The synthetic polyester component of our new solution composition is a highly polymeric linear polymethylene terephthalate with recurring structural units of the general formula:

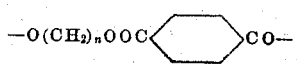

wherein $n$ is an integer from 2 to 10.

These synthetic polyester compositions may be prepared by heating glycols of the series $HO(CH_2)_nOH$ wherein $n$ is an integer within the range of 2 to 10 with terephthalic acid or with an ester forming derivative thereof as is described in United States Patent 2,465,319 of March 22, 1949.

The polymethylene glycols having from 2 to 10 methylene groups which may be employed include ethylene glycol, trimethylene glycol, tetramethylene glycol, pentamethylene glycol, hexamethylene glycol, heptamethylene glycol, octamethylene glycol, nonamethylene glycol and decamethylene glycol. It is preferable to employ glycols having 2 to 4 methylene groups since they produce highly polymerized esters with very high melting points and of these glycols, ethylene glycol $HO(CH_2)OH$ is favored because of its availability. Mixtures of these glycols can also be employed, if desired.

Suitable ester forming derivatives of terephthalic acid are aliphatic or aromatic esters such as methyl, ethyl, propyl, butyl, amyl, hexyl and heptyl terephthalates and aryl esters such as those from phenol and cresol.

It is well known that these polymers are very slightly or not at all soluble in common low boiling solvents such as acetone, benzene, etc., and that those solvents which are available such as nitrobenzene, orthochlorophenol, cresylic acid and mixtures of tetrachloroethane and phenol are high boiling liquids which are difficult to remove after spinning or coating from solvent solutions. Furthermore the removal of these solvents usually requires such a high temperature that crystallization and embrittlement may occur so as to prevent the cold drawing or rolling of the material.

The present invention, however, permits the production of shaped polyesters which have high strength and dimensional and chemical stability by spinning or coating these polyesters from a novel solvent mixture and then cold drawing or rolling of the material.

An object, therefore, of the present invention is to provide a new composition of matter containing a highly polymeric polymethylene terephthalate dissolved in a solvent mixture containing trifluoroacetic acid and another low boiling solvent.

Another object of the invention is to provide a spinning solution containing highly polymeric polymethylene terephthalate dissolved in trifluoroacetic acid and one of halogenated solvents mentioned hereinafter.

Still another object is to provide a film or sheet containing a highly polymeric polymethylene terephthalate, trifluoroacetic acid and a low boiling halogenated compound mentioned hereinafter.

Other objects of the invention are to provide processes for producing filaments, yarn, sheets and film from solutions containing highly polymeric polymethylene terephthalate dissolved in a mixture of trifluoroacetic acid and a halogenated solvent mentioned hereinafter.

Other objects will appear hereinafter.

In accordance with our invention we have found that the linear polyesters which have recurring structural units of the general formula

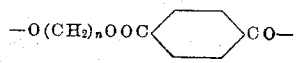

wherein $n$ is an integer from 2 to 10 are soluble in mixtures of trifluoroacetic acid and a halogenated compound selected from the following solvents: methylene chloride, ethylene chloride, chloroform, methylene chlorobromide, methyl chloroform, methyl bromide, 1,1,2-trichloroethane, glyceryl dichlorohydrin, tetrachloroethane, 1,1-difluoro-2,2-dichloroethane, 1,1-difluoro-1,2-dichloroethane, and 1,1-difluoro-2,3-dichloropropene.

It is preferred to employ one part by weight of trifluoroacetic acid with five parts by weight 1,1-difluoro-2,2-dichloroethane; 1,1-difluoro-1,2-dichloroethane or 1,1-difluoro-2,3-dichloropropene. Such solvent mixtures will dissolve up to 18 grams of solute per 100 grams of solvent. The other solvents may be employed in equal amounts by weight with trifluoroacetic acid and will dissolve as much as 25 grams of solute per 100 grams of solvent.

The present invention is further illustrated in the following examples:

Example 1

Twenty grams of an extruded polyethylene terephthalate was dissolved in a mixture of 40 grams of trifluoroacetic acid and 40 grams of ethylene chloride in an Erlenmeyer flask at a temperature of 70° C. in 2 to 3 hours. A clear, viscous dope was obtained which was coated on a glass plate, cured 16 hours at 70° C. to produce a clear, flexible sheet which was found to have the following values:

M. I. T. folds_____ 225
Research tear_____ 55
Tensile strength_____p. s. i__ 2370

Example 2

Twenty grams of an extruded polyethylene terephthalate was dissolved in a mixture of 40 grams of trifluoroacetic acid and 40 grams of chloroform in an Erlenmeyer flask at a temperature of 70° C. in 2 to 3 hours. A clear viscous dope was obtained which was coated on a glass plate, cured 16 hours at 70° C. to produce a clear, flexible sheet which was found to have the following values:

M. I. T. folds _____ 457
Research tear_____ 43
Tensile strength_____p. s. i__ 2240

Example 3

Fifteen grams of an extruded polyethylene terephthalate was dissolved in a mixture of 16 grams of trifluoroacetic acid plus 80 grams of 1,1-difluoro-2,2-dichloroethane (B. P. 60° C.) in an Erlenmeyer flask at a temperature of 70° C. in 2 to 3 hours. A clear, viscous dope was obtained which was coated on a glass plate. After curing 16 hours at 70° C., a clear, flexible sheet was obtained.

Example 4

Twenty grams of an extruded polyethylene terephthalate was dissolved in a mixture of 40 grams of trifluoroacetic acid and 40 grams of methyl chloroform (B. P. 72° C.) at a temperature of 70° C. in 2 to 3 hours. A clear, viscous dope was obtained which was coated on a glass plate. After curing 16 hours at 70° C., a clear, flexible sheet was obtained.

Example 5

Twenty grams of an extruded polyethylene terephthalate was dissolved in a mixture of 40 grams of trifluoroacetic acid and 40 grams of 1,1,2-trichloroethane (B. P. 110° C.) at a temperature of 70° C. for 2 to 3 hours. A clear, viscous dope was obtained which was coated on a glass plate. After curing 16 hours at 70° C., a clear, flexible sheet was obtained.

Example 6

Twenty grams of polyethylene terephthalate were dissolved in a mixture of 40 grams of trifluoroacetic acid and 40 grams of ethylene chloride. The clear viscous dope was filtered through wool felt and spun into air at 25° C. through a spinnerette. The threads were then stretched in a suitable manner, 300% or more, to produce slightly opaque strong threads.

Example 7

Twenty grams of polyethylene terephthalate were dissolved in 40 grams of trifluoroacetic acid and 40 grams of chloroform, filtered and spun as in Example 6 to give filaments. These filaments were stretched 300% or more to produce strong threads.

Example 8

Fifteen grams of polyethylene terephthalate were dissolved in a mixture of 16 grams of trifluoroacetic acid and 80 grams of 1,1 difluoro-2,2-dichloroethane (B. P. 60° C.), filtered and spun as in Example 6 to give filaments which were cold drawn 300% or more to produce strong threads.

Example 9

Twenty grams of polyethylene terephthalate were dissolved in a mixture of 40 grams of trifluoroacetic acid and 40 grams of methyl chloroform (B. P. 72° C.), filtered, and spun as in Example 6 into filaments, which were cold drawn 300% to give strong threads.

Our invention, therefore, allows polyethylene terephthalate and its related compounds mentioned herein to be formed by more or less conventional spinning and coating processes into shaped articles. Heretofore, the preparation of films and fibers of these polyesters has been impractical except by melt extrusion. The melting of these polyesters often produces degradation which can be avoided by our solvent processes. Spinning and coating from solvent solutions generally results in more uniformity than is obtainable by melt spinning or coating methods.

We claim:

1. As a new composition of matter a highly polymeric linear terephthalate composed of recurring structural units of the general formula:

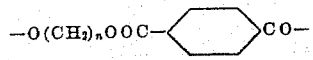

wherein $n$ is an integer from 2 to 10 dissolved in a solvent mixture comprising trifluoroacetic acid and a member selected from the group consisting of methylene chloride, ethylene chloride, chloroform, methylene chlorobromide, methyl chloroform, methyl bromide, 1,1-difluoro-2,2-dichloroethane, 1,1-difluoro-1,2-dichloroethane, 1,1,2-trichloroethane, glyceryl dichlorohydrin and 1,1-difluoro-2,3-dichloropropene.

2. As a new composition of matter a highly polymeric linear terephthalate composed of recurring structural units of the general formula

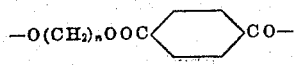

wherein $n$ is an integer from 2 to 10 dissolved in equal parts of trifluoroacetic acid and ethylene chloride.

3. As a new composition of matter a highly polymeric linear terephthalate composed of recurring structural units of the general formula

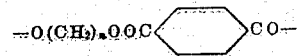

wherein $n$ is an integer from 2 to 10 dissolved in equal parts of trifluoroacetic acid and chloroform.

4. As a new composition of matter a highly polymeric linear terephthalate composed of recurring structural units of the general formula

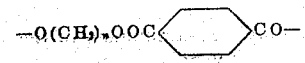

wherein $n$ is an integer from 2 to 10 dissolved in 16 parts of trifluoroacetic acid and 80 parts of 1,1-difluoro-2,2-dichloroethane.

5. As a new composition of matter a highly polymeric linear terephthalate composed of recurring structural units of the general formula

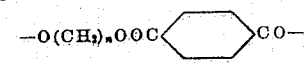

wherein $n$ is an integer from 2 to 10 dissolved in equal parts of trifluoroacetic acid and methyl chloroform.

6. As a new composition of matter a highly polymeric linear terephthalate composed of recurring structural units of the general formula

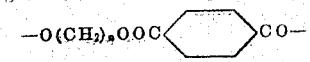

wherein $n$ is an integer from 2 to 10 dissolved in equal parts of trifluoroacetic acid and 1,1,2-trichloroethane.

7. As a new composition of matter polyethylene terephthalate dissolved in trifluoroacetic acid and ethylene chloride.

8. As a new composition of matter polyethylene terephthalate dissolved in trifluoroacetic acid and chloroform.

9. As a new composition of matter polyethylene terephthalate dissolved in trifluoroacetic acid and 1,1-difluoro-2,2-dichloroethane.

10. As a new composition of matter polyethylene terephthalate dissolved in trifluoroacetic acid and methyl chloroform.

11. As a new composition of matter polyethylene terephthalate dissolved in trifluoroacetic acid and 1,1,2-trichloroethane.

References Cited in the file of this patent

UNITED STATES PATENTS

| | | |
|---|---|---|
| 2,497,376 | Swallow | Feb. 14, 1950 |
| 2,556,295 | Pace | June 12, 1951 |